(12) United States Patent
Mann et al.

(10) Patent No.: US 12,348,330 B2
(45) Date of Patent: *Jul. 1, 2025

(54) CONTROL OF ETHERNET LINK-PARTNER GPIO USING OAM

(71) Applicant: Marvell Asia Pte Ltd, Singapore (SG)

(72) Inventors: Jessica Lauren Mann, Pepper Pike, OH (US); Christopher Mash, Harpenden (GB); Timothy See-Hung Lau, Laguna Niguel, CA (US); Hon Wai Fung, Newark, CA (US); Liang Zhu, Shanghai (CN); Dance Wu, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,566

(22) Filed: Nov. 19, 2023

(65) Prior Publication Data

US 2024/0154917 A1    May 9, 2024

Related U.S. Application Data

(63) Continuation of application No. 16/850,027, filed on Apr. 16, 2020, now Pat. No. 11,863,468.

(Continued)

(51) Int. Cl.
*H04W 52/02* (2009.01)
*B60L 3/00* (2019.01)
(Continued)

(52) U.S. Cl.
CPC ........ *H04L 12/40* (2013.01); *H04L 12/40136* (2013.01); *H04L 12/413* (2013.01);
(Continued)

(58) Field of Classification Search
CPC ....... H04L 5/0053; H04L 12/40; H04L 67/12; H04L 1/1607; H04L 12/40136;
(Continued)

(56) References Cited

U.S. PATENT DOCUMENTS 7,493,786 B2 *   2/2009   Kim ................... H04Q 11/0067
                                                        370/392
9,762,429 B2 *   9/2017   Elmaliah ............. G06F 13/4022
(Continued)

FOREIGN PATENT DOCUMENTS

JP        2009135767 A      6/2009
JP        2013246647 A     12/2013

OTHER PUBLICATIONS

Wang et al., "Ethernet Technical Foundations," Technology Forum, China Academic Journal Electronic Publishing House, pp. 55-59, year 2002.

(Continued)

*Primary Examiner* — Edan Orgad
*Assistant Examiner* — Vanneilian Lalchinthang
(74) *Attorney, Agent, or Firm* — Meitar Patents Ltd.; Daniel Kligler (57) ABSTRACT

An Ethernet Physical layer (PHY) device includes a PHY interface and PHY circuitry. The PHY interface is configured to connect to a physical link. The PHY circuitry is configured to generate layer-1 frames that carry data for transmission to a peer Ethernet PHY device, to insert among the layer-1 frames one or more management frames that are separate from the layer-1 frames and that are configured to control a General-Purpose Input-Output (GPIO) port associated with the peer Ethernet PHY device, to transmit the layer-1 frames and the inserted management frames, via the PHY interface, to the peer Ethernet PHY device over the physical link, for controlling one or more operations of the (Continued)

GPIO port associated with the peer Ethernet PHY device, and to receive, via the PHY interface, one or more verifications acknowledging that the one or more management frames were received successfully at the peer Ethernet PHY device.

10 Claims, 5 Drawing Sheets

Related U.S. Application Data (60) Provisional application No. 62/836,536, filed on Apr. 19, 2019.

(51) Int. Cl.
| | |
|---|---|
| *G06F 15/173* | (2006.01) |
| *H01Q 9/04* | (2006.01) |
| *H04L 12/40* | (2006.01) |
| *H04L 12/413* | (2006.01) |
| *H04L 41/04* | (2022.01) |
| *H04L 41/34* | (2022.01) |
| *H04L 49/351* | (2022.01) |
| *H04L 69/323* | (2022.01) |
| *H04L 12/70* | (2013.01) |

(52) U.S. Cl.
CPC .............. *H04L 41/04* (2013.01); *H04L 41/34* (2022.05); *H04L 49/351* (2013.01); *H04L 69/323* (2013.01); *H04L 2012/5625* (2013.01)

(58) Field of Classification Search
CPC ..... H04L 12/413; H04L 41/04; H04L 69/324; H04L 41/00; H04L 41/34; H04L 49/351; H04L 69/323; H04L 2012/40273; H04L 2012/5625; H04L 43/10; H04W 52/0229; G06F 9/4406; G06F 9/4401; Y02D 30/70; B60L 3/0084; G05B 19/042; G05B 2219/25083; G05B 2219/2637; G05B 2219/50393; H01Q 25/04; H01Q 9/0428; H01Q 21/065; H01Q 21/28; H04J 11/003; H04J 11/0036
USPC ........................................................ 370/463
See application file for complete search history.

(56) References Cited

U.S. PATENT DOCUMENTS

| | | | |
|---|---|---|---|
| 9,866,425 B1* | 1/2018 | Lo ................. | H04L 69/323 |
| 11,154,442 B1* | 10/2021 | Dean .............. | A61G 5/1051 |
| 2006/0251067 A1* | 11/2006 | DeSanti .......... | H04L 12/4633 |
| | | | 370/466 |
| 2009/0132838 A1* | 5/2009 | Cherian .......... | G06F 1/3203 |
| | | | 713/320 |
| 2009/0164627 A1* | 6/2009 | Tateno ........... | H04L 69/324 |
| | | | 709/224 |
| 2016/0205224 A1* | 7/2016 | Chini ............. | H04W 84/04 |
| | | | 455/422.1 |
| 2016/0366646 A1* | 12/2016 | Yun ............... | G06F 9/4406 |
| 2017/0222829 A1 | 8/2017 | Kessler et al. | |
| 2018/0234507 A1* | 8/2018 | Tamir ............. | H04L 41/0816 |
| 2018/0281598 A1* | 10/2018 | Shu ............... | G05B 19/042 |
| 2019/0004901 A1* | 1/2019 | Ryan .............. | G06F 1/3253 |
| 2019/0198999 A1* | 6/2019 | Ashrafi ........... | H01Q 9/0428 |

OTHER PUBLICATIONS

JP Application # 2020074413 Office Action dated Apr. 23, 2024.
CN Application # 2020103141806 Office Action dated Jan. 1, 2024.

* cited by examiner

| | D8 | D7 | D6 | D5 | D4 | D3 | D2 | D1 | D0 |
|---|---|---|---|---|---|---|---|---|---|
| Symbol 0 | Even Parity | Reserved | Reserved | Reserved | Reserved | PingRx | PingTx | SNR<1> | SNR<0> |
| Symbol 1 | Odd Parity | Valid | Toggle | Ack | TogAck | GPIO MESSAGE ID | | | |
| Symbol 2 | Odd Parity | Message<0><7:0> | | | | | | | |
| Symbol 3 | Odd Parity | Message<1><7:0> | | | | | | | |
| Symbol 4 | Odd Parity | Message<2><7:0> | | | | | | | |
| Symbol 5 | Odd Parity | Message<3><7:0> | | | | | | | |
| Symbol 6 | Odd Parity | Message<4><7:0> | | | | | | | |
| Symbol 7 | Odd Parity | Message<5><7:0> | | | | | | | |
| Symbol 8 | Odd Parity | Message<6><7:0> | | | | | | | |
| Symbol 9 | Odd Parity | Message<7><7:0> | | | | | | | |
| Symbol 10 | Odd Parity | CRC16 | | | | | | | |
| Symbol 11 | Odd Parity (final bit) | CRC16 | | | | | | | (first bit) |

120

SPACE FOR GPIO COMMANDS 124

CONTROL OF ETHERNET LINK-PARTNER GPIO USING OAM

CROSS-REFERENCE TO RELATED APPLICATIONS

This application is a continuation of U.S. patent application Ser. No. 16/850,027, filed Apr. 16, 2020, which claims the benefit of U.S. Provisional Patent Application 62/836,536, filed Apr. 19, 2019. The disclosures of these related applications are incorporated herein by reference.

FIELD OF THE DISCLOSURE

The present disclosure relates generally to Ethernet communication, and particularly to methods and systems for operating General-Purpose Input-Output (GPIO) interfaces using management frames such as Ethernet Operations, Administration and Maintenance (OAM) frames.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media for automotive applications is specified in IEEE Standard 802.3 bp™-2016, entitled "IEEE Standard for Ethernet; Amendment 4: Physical Layer Specifications and Management Parameters for 1 Gb/s Operation over a Single Twisted-Pair Copper Cable," June, 2016. This standard is referred to herein as "IEEE 802.3 bp" for brevity. Section 97.3.8 of the IEEE 802.3 bp standard specifies 1000BASE-T1 Operations, Administration and Maintenance (OAM).

The description above is presented as a general overview of related art in this field and should not be construed as an admission that any of the information it contains constitutes prior art against the present patent application.

SUMMARY OF THE INVENTION

An embodiment that is described herein provides an Ethernet Physical layer (PHY) device, operative to control a remote peer Ethernet PHY device. The Ethernet PHY device includes a PHY interface and PHY circuitry. The PHY interface is configured to connect to a physical link. The PHY circuitry is configured to generate layer-1 frames that carry data for transmission to a peer Ethernet PHY device, to insert among the layer-1 frames one or more management frames that are separate from the layer-1 frames and that are configured to control a General-Purpose Input-Output (GPIO) port associated with the peer Ethernet PHY device, to transmit the layer-1 frames and the inserted management frames, via the PHY interface, to the peer Ethernet PHY device over the physical link, for controlling one or more operations of the GPIO port associated with the peer Ethernet PHY device, and to receive, via the PHY interface, one or more verifications acknowledging that the one or more management frames were received successfully at the peer Ethernet PHY device.

In some embodiments, the PHY circuitry is configured to insert the management frames by inserting one or more Operations, Administration and Maintenance (OAM) frames. In an embodiment, in at least one of the management frames, the PHY circuitry is configured to instruct the peer Ethernet PHY device to set the GPIO port to a specified output logic level. In another embodiment, in at least one of the management frames, the PHY circuitry is configured to instruct the peer Ethernet PHY device to read an input logic level of the GPIO port. In a disclosed embodiment, in at least one of the management frames, the PHY circuitry is configured to instruct the peer Ethernet PHY device to control a microcontroller to perform a safety-control operation in a vehicle.

In some embodiments, the PHY circuitry is configured to receive the one or more management frames from a host. In other embodiments, the PHY circuitry is configured to receive, via a register, parameters for controlling the GPIO port, and to compose the one or more management frames based on the parameters.

There is additionally provided, in accordance with an embodiment that is described herein, an Ethernet Physical layer (PHY) device controlled by a remote peer Ethernet PHY device. The Ethernet PHY device includes a PHY interface and PHY circuitry. The PHY interface is configured to connect to a physical link, The PHY circuitry is configured to receive, via the PHY interface, layer-1 frames that carry data sent from the peer Ethernet PHY device over the physical link, to receive among the layer-1 frames one or more management frames that were sent from the peer PHY device to control a General-Purpose Input-Output (GPIO) port associated with the Ethernet PHY device, to control the GPIO port responsively to instructions included in the one or more management frames, and to transmit to the peer Ethernet PHY device, via the PHY interface, one or more verifications, acknowledging that the one or more management frames were received successfully.

In some embodiments, the PHY circuitry is configured to receive the management frames by receiving one or more Operations, Administration and Maintenance (OAM) frames. In an example embodiment, in response to at least one of the management frames, the PHY circuitry is configured to set the GPIO port to a specified output logic level. In another embodiment, in response to at least one of the management frames, the PHY circuitry is configured to read an input logic level of the GPIO port, and to report the input logic level of the GPIO to the peer Ethernet PHY device. In some embodiments, in response to at least one of the management frames, the PHY circuitry is configured to control a microcontroller to perform a safety-control operation in a vehicle.

There is further provided, in accordance with an embodiment that is described herein, an Ethernet communication system including a microcontroller, a first Ethernet PHY device and a second Ethernet PHY device. The first Ethernet PHY device is connected to the microcontroller by a General-Purpose Input-Output (GPIO) port. The second Ethernet PHY device is connected to the first Ethernet PHY device via a physical link. The second Ethernet PHY device is configured to exchange with the first Ethernet PHY device layer-1 frames that carry data, to transmit to the first Ethernet PHY device, among the layer-1 frames, one or more management frames that are separate from the layer-1 frames and that are configured to control the microcontroller via the GPIO port of the first Ethernet PHY device, and to receive, via the PHY interface, from the first Ethernet PHY device, one or more verifications acknowledging that the one or more management frames were received successfully at the first Ethernet PHY device.

In an embodiment, in at least one of the management frames, the second Ethernet PHY device is configured to initiate a safety-control operation in a vehicle, the first Ethernet PHY device is configured to control the microcontroller via the GPIO port to perform the safety-control operation, and the microcontroller is configured to perform the safety-control operation in response to control of the GPIO port.

In another embodiment, in response to at least one of the management frames, the first Ethernet PHY device is configured to reset the microcontroller via the GPIO port. In yet another embodiment, in response to at least one of the management frames, the first Ethernet PHY device is configured to read a status of the microcontroller via the GPIO port. In still another embodiment, the first Ethernet PHY device is configured to control the GPIO port irrespective of whether the microcontroller is functional or malfunctioning.

There is also provided, in accordance with an embodiment that is described herein, a method for controlling a remote peer Ethernet Physical layer (PHY) device. The method includes, in an Ethernet PHY device that is connected to the peer Ethernet PHY device over a physical link, generating layer-1 frames that carry data for transmission to the peer Ethernet PHY device. One or more management frames are inserted among the layer-1 frames in the Ethernet PHY device. The one or more management frames are separate from the layer-1 frames and are configured to control a General-Purpose Input-Output (GPIO) port associated with the peer Ethernet PHY device. The layer-1 frames and the inserted management frames are transmitted from the Ethernet PHY device to the peer Ethernet PHY device over the physical link, for controlling one or more operations of the GPIO port associated with the peer Ethernet PHY device. One or more verifications, acknowledging that the one or more management frames were received successfully at the peer Ethernet PHY device, are received in the Ethernet PHY device from the peer Ethernet PHY device.

There is additionally provided, in accordance with an embodiment that is described herein, a method for controlling a General-Purpose Input-Output (GPIO) port associated with an Ethernet Physical layer (PHY) device. The method includes receiving in the Ethernet PHY device layer-1 frames that carry data sent from a peer Ethernet PHY device over a physical link. One or more management frames, which were sent from the peer PHY device to control the GPIO port associated with the Ethernet PHY device, are received among the layer-1 frames. The GPIO port associated with the Ethernet PHY device is controlled responsively to instructions included in the one or more management frames. One or more verifications, acknowledging that the one or more management frames were received successfully, are transmitted from the Ethernet PHY device to the peer Ethernet PHY device.

The present disclosure will be more fully understood from the following detailed description of the embodiments thereof, taken together with the drawings in which:

DETAILED DESCRIPTION OF EMBODIMENTS

Embodiments that are described herein provide improved methods and systems for Ethernet communication, in which an Ethernet PHY device controls a GPIO port in a peer Ethernet PHY device via the exchange of management frames, e.g., Operations, Administration and Maintenance (OAM) frames.

In some embodiments, an Ethernet PHY device communicates with a peer PHY device over a physical link, e.g., a twisted-pair link. Among other functions, the PHY device is configured to generate layer-1 frames that encode layer-2 Ethernet frames in a way that is suitable for transmission over the physical link (physical medium) to the peer PHY device. The peer PHY device (also referred to as a "link partner") is associated with a General-Purpose Input-Output (GPIO) port (e.g., comprises an integral GPIO port or connected locally to a host that comprises a GPIO port). Typically, encoding of layer-2 frames to produce a stream of layer-1 frames is not a one-to-one translation process. The encoding process is typically performed in accordance with a suitable algorithm specified for the applicable link-layer technology.

In assembling the stream of layer-1 frames, the PHY device is configured to encode, among the layer-2 Ethernet frames, one or more Ethernet OAM frames that are configured to control the GPIO port associated with the peer PHY device (sometimes referred to as a link partner). The PHY device is configured to transmit the layer-1 frames, which comprise the layer-2 frames and the OAM frames, to the peer PHY device over the physical link.

Ethernet OAM, as specified, for example, in the IEEE 802.3 bp standard, cited above, supports a built-in acknowledgement mechanism that uses OAM frames in the opposite direction. In some embodiments, the PHY device is configured to receive, from the peer PHY device, one or more OAM verifications acknowledging that the one or more OAM frames were received successfully at the peer Ethernet PHY device. In this manner, a highly reliable mechanism for controlling remote GPIO ports is implemented entirely within the PHY link layer, i.e., within OSI layer-1.

It is possible in principle to control a remote GPIO port using conventional Ethernet frames that are dedicated for GPIO control. This solution, however, affects the Medium Access Control (MAC) layer and possibly upper layers, is complicated to implement and incurs large delay. The disclosed techniques, on the other hand, are implemented entirely within the PHY device without involving upper layers, are simpler to implement and incur minimal latency overhead.

Moreover, controlling a remote GPIO port using dedicated Ethernet frames typically requires the use of additional microcontrollers and software stacks, and additional scheduling and interleaving of such Ethernet frames among other data frames. This added complexity introduces unreliability and risk of missed delivery. Furthermore, the disclosed techniques provide suitable replacement for Controller Area Networks (CAN), which are used in some conventional automotive networks as redundant communication means for safety messages between Electronic Control Units (ECUs). As will be explained and demonstrated below, the reliability of the disclosed techniques is not dependent on other systems or controllers—In some typical implementations the disclosed solution is fully self-contained in a single Integrated Circuit (IC).

Some of the embodiments disclosed herein are described in the context of automotive applications, e.g., systems in which various automotive peripherals communicate with Electronic Control Units (ECUs), and ECUs communicate with one another. Other example embodiments are described in the context of avionic communication systems. Some example use-cases pertain to safety control features in automotive and avionic communication systems. These embodiments and use-cases, however, are provided solely by way of example. The disclosed techniques are equally applicable in other applications, for example in industrial and/or smart-home networks.

For the sake of clarity, the embodiments described herein refer mainly to Ethernet OAM frames. Generally, however, the disclosed techniques are in no way limited to OAM frames, and can be implemented using any suitable type of management frames.

In some embodiments, the OAM frames are composed by a host coupled to the PHY device. In these embodiments the PHY device receives the OAM frames from the host, and encodes them as part of the stream of layer-1 frames. In alternative embodiments, the OAM frames are composed internally in the PHY device. In an example embodiment, the PHY device receives, e.g., via a register, parameters for controlling the remote GPIO, and composes an OAM frame based on the received parameters.

Figure 1:
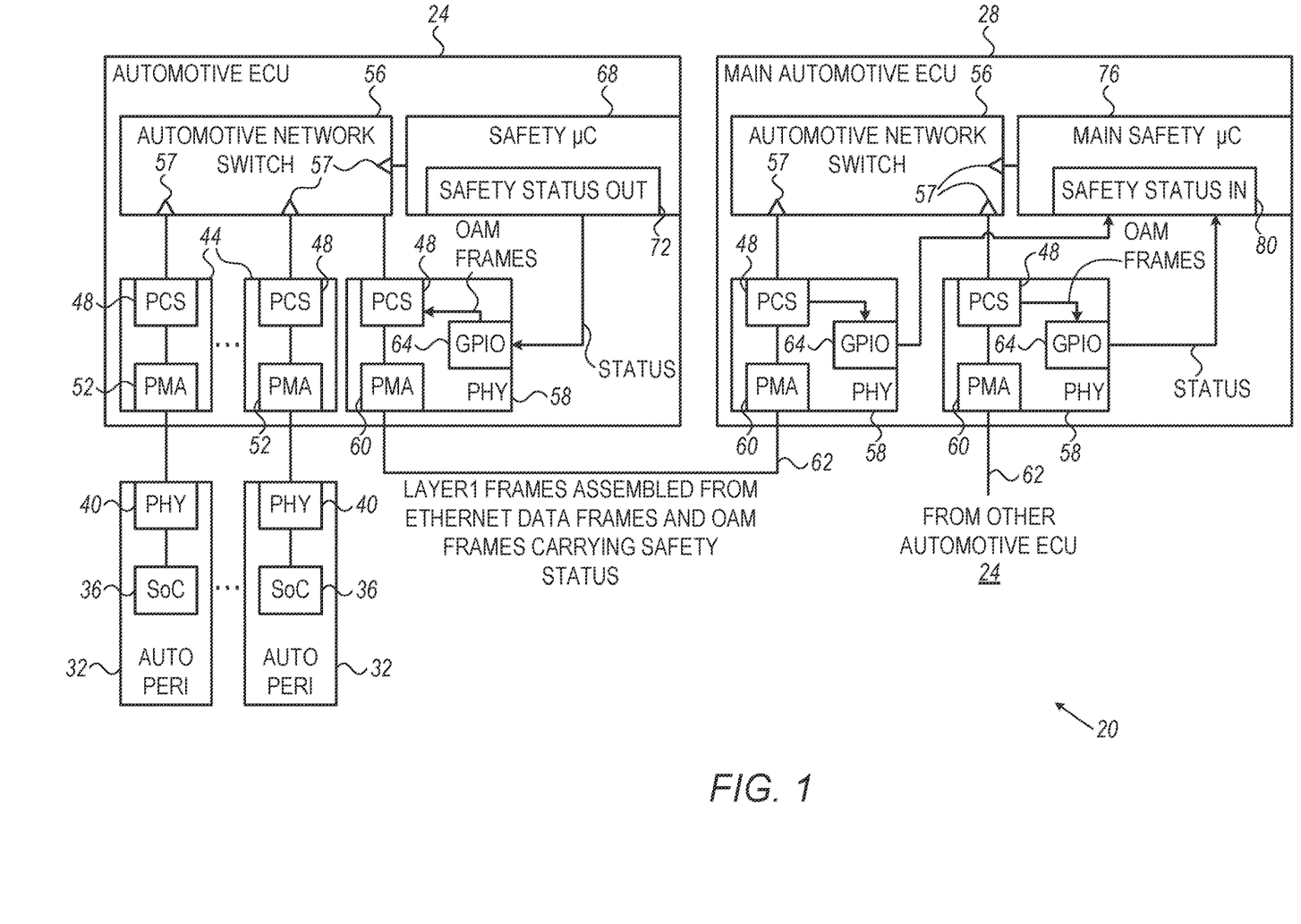
FIG. 1 is a block diagram that schematically illustrates an automotive communication system, in accordance with an embodiment that is described herein.

FIG. 1 is a block diagram that schematically illustrates an automotive communication system 20, in accordance with an embodiment that is described herein. System 20 is typically installed in a vehicle, e.g., a passenger car. System 20 comprises one or more automotive Electronic Control Units (ECUs) 24 and a main automotive ECU 28, which control a plurality of Automotive peripherals 32 using Ethernet communications.

Among other tasks, ECUs 24 and main ECU 28 verify the safety status of the various system components by sending safety status messages embedded in Ethernet OAM frames, and controlling remote GPIO ports based on the embedded safety status messages, as will be explained in detail below. In the present example, system 20 operates in accordance with the IEEE 802.3 bp standard, cited above. Alternatively, however, any other suitable Ethernet standard, or other suitable network communication protocol, can be used. The disclosed techniques can be used for modifying any suitable physical layer to carry extra information for the purpose of remote GPIO control.

In various embodiments, automotive peripherals 32 may comprise, for example, lidar, radar, camera, stereo amplifier, telematics radio, body ECU, powertrain, and/or any other suitable type of peripheral. For purposes of communication and control, each peripheral 32 comprises a host controller, also referred to as a System-on-Chip (SoC) 36, and a PHY device 40. Each peripheral 32 is connected to one of ECUs 24 by a respective physical link.

Each ECU 24 comprises multiple PHY devices 44 that communicate with peripherals 32. Each PHY device 44 comprises Physical Coding Sublayer (PCS) circuitry 48 that carries out PCS functions of the PHY device, and Physical Media Attachment sublayer (PMA) circuitry 52 that carries out PMA functions of the PHY device.

In an embodiment, each ECU 24 further comprises an automotive Ethernet network switch 56 that connects peripherals 32 to main ECU 28. Switch 56 comprises multiple ports 57. Each PHY device 48 is connected to a respective port 57 of switch 56. Each ECU 24 further comprises a safety microcontroller (μC) 68 that verifies the safety status of ECU 24 and/or of the associated peripherals 32, and sends corresponding safety messages to main ECU 28. Safety μC 68 comprises a status output circuit 72 that outputs the safety status messages as one or more logic signals (denoted "STATUS" in the figure).

In the present example, each ECU 24 comprises a PHY device 58, which is responsible for communication with main ECU 28. PHY device 58 is connected to one of ports 57 of switch 56, and to a physical link 62 that connects ECU 24 with main ECU 28. In the present example link 62 comprises a twisted-pair link in accordance with IEEE 802.3 bp.

As part of the communication with main ECU 28, PHY device 58 transmits conventional layer-2 Ethernet frames, and also transmits the safety status messages generated by safety μC 68 embedded in Ethernet OAM frames. Typically, PHY device 58 combines the layer-2 Ethernet frames with the OAM frames in accordance with the applicable link-layer algorithm, to form a layer-1 frames for transmission over the physical medium. In the case of IEEE 802.3 bp, the physical medium comprises an Unshielded Twisted Pair (UTP).

PHY device 58 of ECU 24 comprises PCS circuitry 48, PMA circuitry 60, and GPIO control circuitry 64. GPIO control circuitry 64 receives the (one or more) logic signals that carry the safety status messages from safety μC 68, using (one or more) respective GPIO input ports. PHY device 58 embeds the safety status messages in Ethernet OAM frames, and inserts the OAM frames into the stream of Ethernet layer-1 frames that are transmitted over link 62 to main ECU 28. This functionality, and the internal structure of PHY device 58, are addressed in greater detail in FIG. 2 below.

Main ECU 28 comprises a network switch 56, multiple PHY devices 58 connected to ports 57 of network switch 56, and a main safety μC 76. Each PHY device 58 is connected to a respective ECU 24 over a respective physical link 62.

In each PHY device 58 of main ECU 28, PMA circuitry 60 and PCS circuitry 48 transfer conventional Ethernet traffic between ECU 24 and switch 56 of main ECU 28. In addition, in each PHY device 58 of main ECU 28, PCS circuitry 48 extracts the OAM frames from the stream of layer-1 frames received from ECU 24, extracts the safety status messages from the OAM frames, and sends the safety status messages to GPIO control circuitry 64. GPIO control circuitry 64 sets one or more GPIO outputs according to the safety status messages. Main safety μC 76 comprises a status input circuit 80 that receives the GPIO outputs from PHY devices 58. Main safety μC 76 may initiate any suitable safety-related action in response to the safety status messages received from the various safety μCs 68 of ECUs 24.

Figure 2:
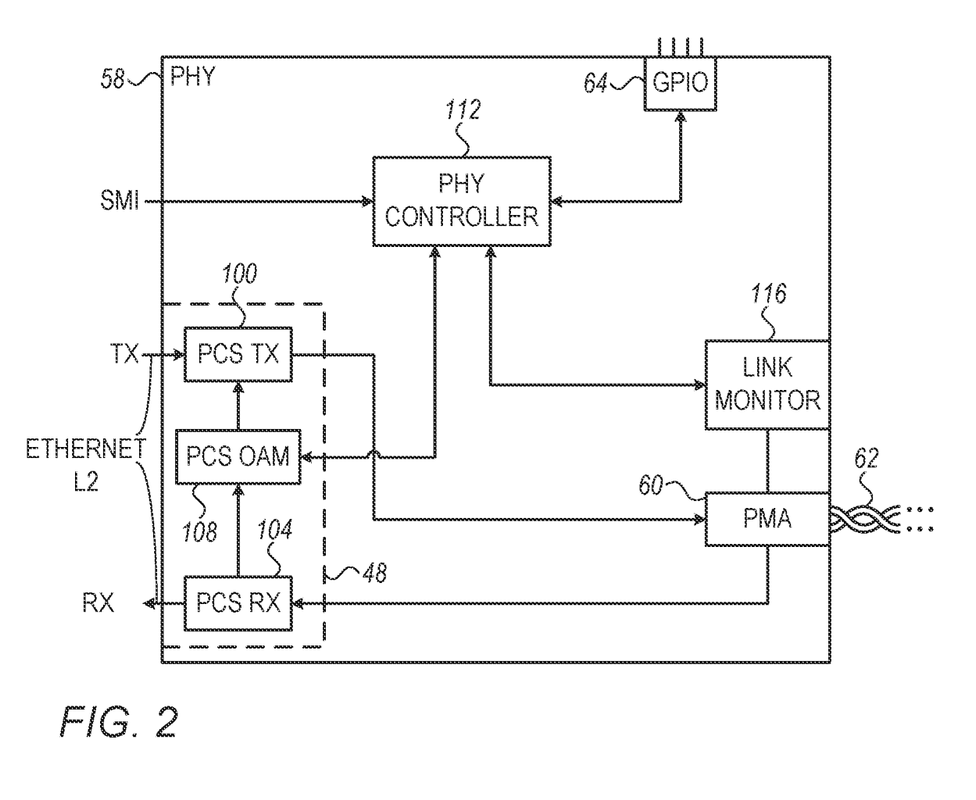
FIG. 2 is a block diagram that schematically illustrates an Ethernet Physical layer (PHY) device in the system of FIG. 1, in accordance with an embodiment that is described herein.

FIG. 2 is a block diagram that schematically illustrates the internal structure of Ethernet PHY device 58 of system 20, in accordance with an embodiment that is described herein. Typically, PHY devices 58 in ECUs 24 and in main ECU 28 have a similar internal structure. In the present example, PCS circuitry 48 comprises a PCS transmission (TX) circuit 100, a PCS reception (RX) circuit 104, and a PCS OAM circuit 108.

PCS TX circuit 100 receives Ethernet layer-2 frames for transmission (e.g., from switch 56), encodes them so as to produce a stream of layer-1 frames, and provides the layer-1 frames to PMA circuit 60. PMA circuit 60, which is also referred to herein as a PHY interface, transmits the layer-1 frames over physical link 62. In the opposite direction, PMA circuit 60 receives layer-1 frames over physical link 62 and delivers them to PCS RX circuit 104. PCS RX circuit 104 decodes the layer-1 frames so as to produce layer-2 frames, and outputs the layer-2 frames (e.g., to switch 56).

In some embodiments, PHY device 58 further comprises a PHY controller 112, a link monitor 116, and GPIO control circuitry 64. PHY controller 112 is connected to switch 56 (e.g., to a Medium Access Control (MAC) device in switch 56) over a Serial Management Interface (SMI), e.g., for receiving control and configuration commands from the switch. Switch 56 may, for example, initialize and monitor PHY device 58 via the SMI. Link monitor 116 is configured to monitor the quality of communication over physical link 62.

In some embodiments, PHY controller 112 is also responsible for transmitting and receiving safety status messages. When PHY device 58 operates in one of ECUs 24, PHY controller 112 receives (from safety μC 68, via GPIO control circuitry 64) logic values that are indicative of safety status messages to be reported to main ECU 28. PHY controller 112 sends the logic values to PCS OAM circuit 108. PCS OAM circuit 108 constructs one or more OAM frames that carry the safety status messages, and includes the OAM frames in the stream of layer-1 frames that are produced by PCS TX circuit 100. The layer-1 frames, which have been encoded from the layer-2 Ethernet frames and from the OAM frames, are transmitted by PMA circuitry 60 over link 62.

When PHY device 58 operates in main ECU 28, PMA circuitry 60 receives a stream of layer-1 frames over link 62, which encode layer-2 Ethernet frames and also one or more OAM frames that carry safety status messages, from one of ECUs 24. PMA circuitry 60 delivers the stream of layer-1 frames to PCS RX circuit 104. PCS OAM circuit 108 extracts the OAM frames from the stream, extracts the safety status messages from the OAM frames, and sends the corresponding logic values to PHY controller 112. PHY controller 112 sends the logic values to GPIO control circuitry 64, which in turn sets the appropriate GPIO outputs. The GPIO outputs are provided in this manner as inputs to status input circuit 80 of main safety μC 76.

In the embodiments described herein, the logic values (which are exchanged between safety μC 68 and main safety μC 76 and are indicative of safety status messages) are static, discrete logic values. The disclosed techniques, however, are not limited to this sort of implementation. In alternative embodiments, any of the logic value may change over time, and thus, for example, form temporal patterns of logic values that carry multiple bits of information. By varying a logic value on a certain GPIO port (pin) over time, it is possible to implement a serial data link that transfers data between PHY devices in accordance with any suitable protocol. By varying multiple logic values corresponding to multiple respective GPIO ports (pins), the disclosed techniques can be used to implement a parallel data link between the PHY devices. Additionally or alternatively, the logic values need not necessarily be discrete, digital value, and may comprise analog waveforms that carry information in any suitable way.

In the present context, PCS circuitry 48 (including PCS TX circuit 100, PCS RX circuit 104 and PCS OAM circuit 108), PHY controller 112, GPIO control circuit 64 and link monitor 116 are referred to jointly as "PHY circuitry." In alternative embodiments, the PHY circuitry may be implemented in any other suitable manner.

Figure 3:
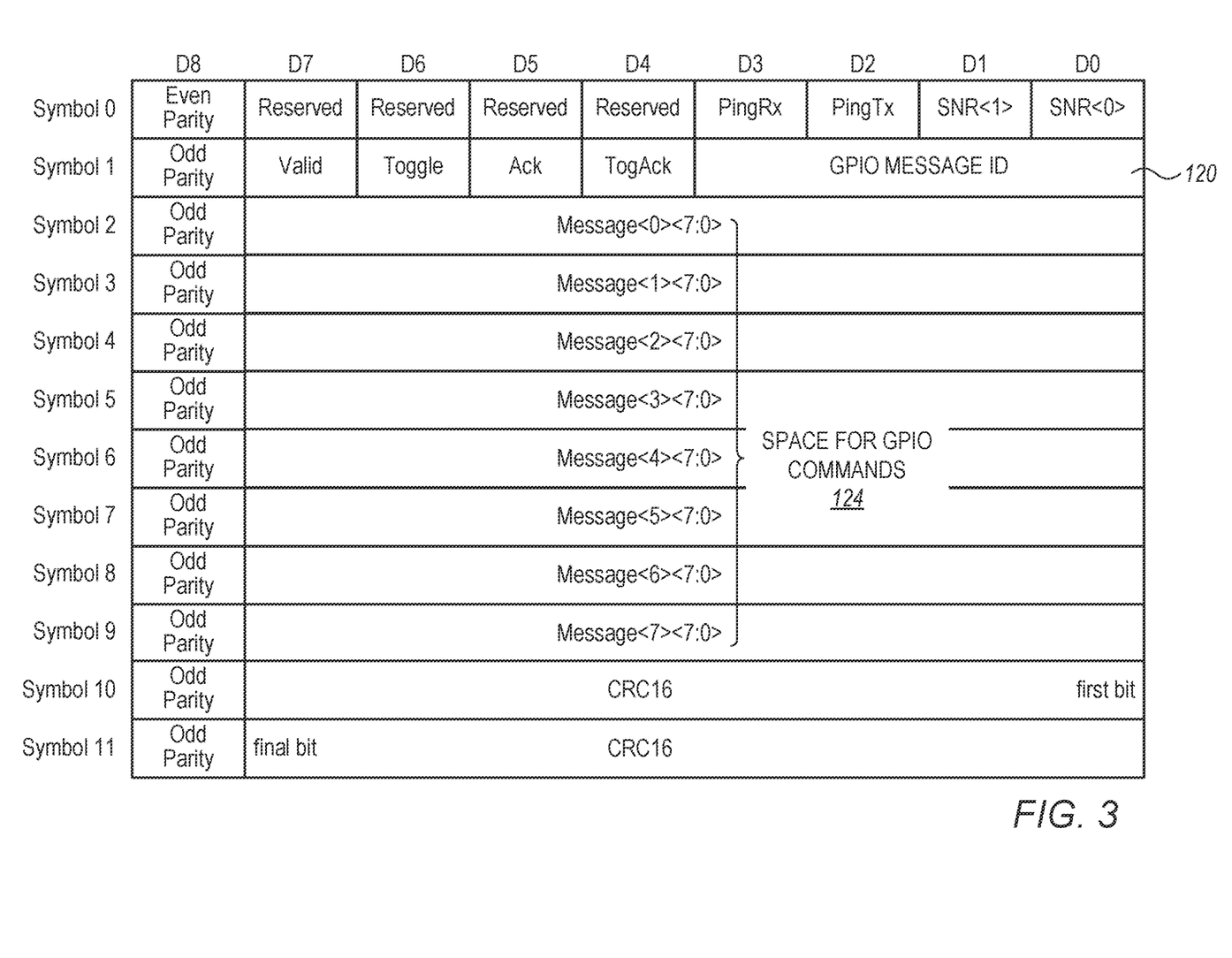
FIG. 3 is a diagram showing an Ethernet Operations, Administration and Maintenance (OAM) frame that carries a GPIO command, in accordance with an embodiment that is described herein.

FIG. 3 is a diagram showing an OAM frame that carries a GPIO command, e.g., a safety status message, in accordance with an embodiment that is described herein. In an embodiment, a PHY device (e.g., PHY device 58 of FIGS. 1 and 2) uses OAM frames of this sort for controlling remote GPIO ports of a link partner (e.g., a remote PHY device 58). The structure of the example OAM frame of FIG. 3 is compliant with section 97.3.8 of the IEEE 802.3 bp standard, cited above. The disclosed techniques, however, are in no way limited to any specific format, and any other suitable formats. Moreover, as noted above, the disclosed techniques can be implemented using other suitable kinds of management frames, not necessarily OAM frames.

As seen in the figure, the OAM frame comprises twelve symbols (denoted Symbol_0 through Symbol_11), each symbol comprising nine bits (denoted D0 through D8). Symbol_0, bits D4-D7 of Symbol_1, and Symbol_10 and symbol_11, as well as bit D8 of each symbol, are defined as in IEEE 802.3 bp.

In some embodiments, a "Message number" field 120, which occupied bits D0-D3 of Symbol_1, is set to a four-bit value that is dedicated to indicate a GPIO message. In various embodiments, any or all of symbol 2 through Symbol_10 may serve as a space 124 for the actual GPIO command or commands. In one embodiment, each symbol is used for specifying GPIO commands for a respective different GPIO port (input or output) of the remote PHY device.

In one embodiment, "Message number" field 120 in Symbol_1 of the OAM frame is set to 4b' 1111, although any other suitable value can be used. The GPIO command is embedded in Symbol_8 and Symbol_9 of the OAM frame, as follows:

TABLE 1

Example GPIO command format (in OAM frame)

| | D7 | D7, D6 | D5-D3 | D2-D0 |
|---|---|---|---|---|
| Symbol 8 | Odd Parity | GPIO Command<2:0> | GPIO Direction<2:0> | GPIO Value<2:0> |
| Symbol 9 | Odd Parity | | 8b' 00000001 (Remote GPIO) | |

As seen, Symbol_9 is set to 0x01 to indicate that the OAM frame carries a remote GPIO command. The GPIO command in Symbol_8 comprises the following fields:

GPIO command code (0x00 indicating GPIO read request, 0x01 indicating GPIO write request, 0x02 indicating GPIO read response, i.e., acknowledgement, and 0x03 a reserved value).

GPIO direction bit ("1"=output, "0"=input).

GPIO value ("1"=high, "0"=low).

Alternatively, any other suitable format and/or any other suitable numerical values can be used for embedding a GPIO Command in an OAM frame.

In an embodiment, when the disclosed remote GPIO feature is enabled in both link partners (PHY devices), the feature begins working upon link-up. During operation, the pin status and value of each GPIO port (pin) is typically mirrored both to GPIO control circuit 64 (of the remote PHY device) and to the remote GPIO register. In an embodiment, following the example of Table 1 above, the GPIO register at the remote PHY device has the following format:

TABLE 2

Example GPIO register format

| D15 | D14 | D13 | D12 | D11 | D10 | D9 | D8 |
|---|---|---|---|---|---|---|---|
| Enable | | | | Reserved | | | |
| D7 | D6 | D5-D3 | | | D2-D0 | | |
| Execute | R/W | GPIO Direction<2:0> | | | GPIO Value<2:0> | | |

In this example, the bits of the GPIO register are defined as follows:
Bit<15>: Enable Remote GPIO Control Feature.
Bit<14:8>: Reserved and set to all 0 s.
Bit<7>: Set to 1 to execute GPIO Read/Write. When bit 6 (defined below) indicates GPIO write, the PHY device automatically sends a "GPIO Write Request" to the link partner with the GPIO direction and value in bit <5:0>. When bit 6 indicates GPIO read, the PHY device automatically sends a "GPIO Read Request" and updates bit <5:0> with the received GPIO direction and value in the subsequently received "GPIO Read response" OAM frame. This bit is automatically cleared when the GPIO write is acknowledged by the link partner, or when a GPIO read response is received for a GPIO read request.
Bit<6>: 0=Read, 1=Write
Bit<5:3>: GPIO Direction<2:0>
Bit<2:0>: GPIO Value<2:0>

In an embodiment, the update rate of the GPIO information is set to match the OAM period (3.6 μs*12=43.2 μs). When the disclosed remote GPIO feature is enabled, upon receiving a new OAM frame that carries a GPIO command, the remote PHY device interprets the "GPIO Command" field to determine the appropriate action.

If the GPIO command is a "GPIO Write Request," the remote PHY device updates its local GPIO register and GPIO pin according to the direction and value indicated in the OAM frame, and marks the OAM frame as read. Upon servicing the GPIO command, the mr_rx_1p_valid state variable (specified in IEEE 802.3 bp) is cleared to "0" to indicate that the PHY device is ready for the next OAM frame.

When the GPIO command is a "GPIO Read Request," the remote PHY device transmits back to the requesting PHY device a "Remote GPIO OAM" frame. In this "Remote GPIO OAM" frame, the GPIO Command is set to "GPIO Read Response" and the "GPIO Direction" and "GPIO Value" fields reflecting the current status of the local GPIO register. Upon servicing the GPIO command, the mr_rx_1p_valid is cleared to "0" to indicate that the PHY device is ready for the next OAM frame.

When the GPIO command is "GPIO Read Response," the recipient PHY device stores the received remote GPIO direction and value in its remote GPIO register. Upon servicing the command, if the read request originated from the remote GPIO register, then mr_rx_1p_valid is cleared to "0" to be ready for the next OAM frame. Otherwise, mr_rx_1p_valid is retained at "1" for a management entity to handle through OAM message register.

In some practical scenarios, it may occur that an existing OAM frame is in-flight (i.e., transmitted but not yet acknowledged), and at the same time another user OAM frame is awaiting transmission. In such a case, the PHY device typically transmits the remote GPIO OAM frame immediately after the existing OAM transmission is acknowledged, but before transmitting the next user OAM message. The management entity would typically detect and handle the scenario where an OAM frame cannot be transmitted for an extended period of time due to the link partner's management entity not processing OAM, as in normal OAM operations.

In an embodiment, e.g., when using "open drain" mirroring, a single GPIO port (pin) can be used for bi-directional signaling, i.e., as both an input and an output. This sort of implementation is useful, for example, to transfer a two-wire serial interface bi-directionally for initialization, monitoring, or management of a remote system. In an example embodiment, after initialization or other management task is completed, a mode switch can be performed to use the GPIO pin as a single-direction pin.

Figure 4:
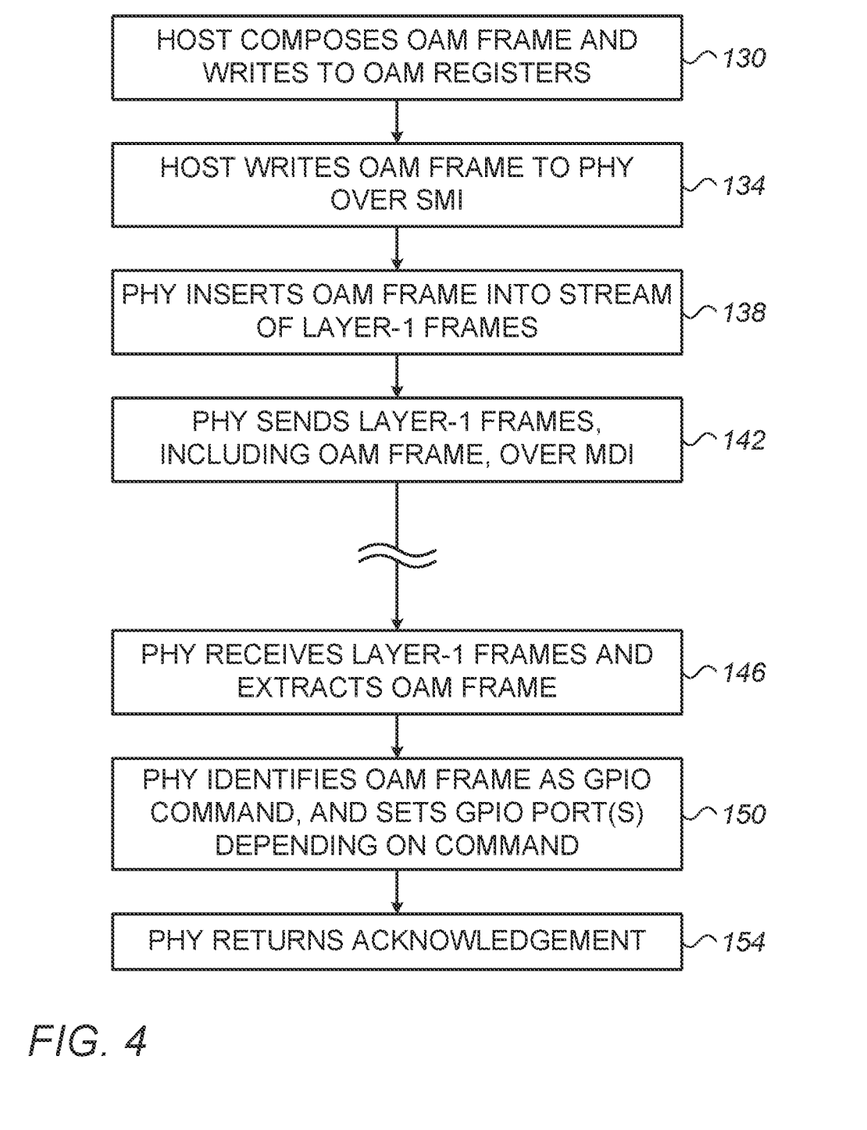
FIG. 4 is a flow chart that schematically illustrates a method for controlling a General-Purpose Input-Output (GPIO) port in a peer Ethernet PHY device, in accordance with an embodiment that is described herein.

FIG. 4 is a flow chart that schematically illustrates a method, which is carried out by an Ethernet PHY device 58 for controlling a GPIO port in a peer Ethernet PHY device 58, in accordance with an embodiment that is described herein. The method begins with the host of the PHY device (e.g., a MAC device in network switch 56) composing an OAM frame having a GPIO command embedded therein, at an OAM frame composition operation 130. The host writes the OAM frame to the host's OAM registers. At a writing operation 134, the host writes the OAM frame from the OAM registers to the PHY device over the SMI.

At an insertion operation 138, PHY controller 112 and PCS OAM circuit 108 of the PHY device include the OAM frame in the stream of layer-1 frames that PCS TX circuit 100 produces from layer-2 Ethernet frames, e.g., between two successive layer-2 Ethernet frames. At a transmission operation 142, PMA circuitry 60 of the PHY device transmits the layer-1 frames to the peer PHY device using the Media-Dependent Interface (MDI), e.g., over link 62. The layer-1 frames convey the layer-2 Ethernet frames and the OAM frame.

In the peer PHY device, PMA circuitry 60 receives the stream of layer-1 frames, and PCS OAM circuit 108 extracts the OAM frame from the stream, at a reception and extraction operation 146. At a GPIO command processing operation 150, PHY controller 112 identifies the OAM frame as carrying a GPIO command, and controls GPIO control circuit 64 accordingly. For example, if the GPIO commands is a write command, PHY controller 112 writes the value specified in the command to the GPIO port specified in the command. If the GPIO commands is a read command, PHY controller 112 reads a value from the GPIO port specified in the command.

At an acknowledgement operation 154, PHY controller 112 of the peer PHY device composes and returns an acknowledgement message to the PHY device that initiated the GPIO command. The acknowledgement message, as specified in section 97.3.8.2.8 of IEEE 802.3 bp, is itself an OAM frame sent in the opposite direction.

The method of FIG. 4 is an example method, which is depicted solely for the sake of clarity. In alternative embodiments, the PHY device and the peer PHY device may carry out the disclosed techniques using any other suitable flow of operations. For example, in an alternative embodiment the PHY device, not the host, composes the OAM frame that carries the GPIO command. In this embodiment, the host typically sends the command parameters (e.g., command code, GPIO port number, and value to be written in case of a write command), and PHY controller 112 composes the OAM frame using these parameters.

In various embodiments, the PHY device may use the disclosed techniques to apply any suitable action using the GPIO port or ports of the remote PHY device. In one example embodiment, a GPIO port of the remote PHY device is connected to a reset pin of a remote host, and the PHY device uses the disclosed technique for resetting the remote host remotely, over the physical Ethernet link. In another example embodiment, a "status output" port of a remote host is connected to a GPIO port of the remote PHY device, and the PHY device uses the disclosed technique for querying the status of the remote host remotely, over the physical Ethernet link. In an embodiment, "status output" ports of two or more remote hosts are combined using suitable logic (e.g., an OR or NOR gate) and the output of the logic is connected to a GPIO port of the remote PHY device. In this manner, the PHY device is able to query a combined status of multiple remote hosts (e.g., whether any of the hosts has failed) using a single GPIO port.

The description above illustrates an example use-case of the disclosed remote GPIO control technique, for exchanging safety status messages between safety microcontrollers in an automotive communication system. The description below provides two additional example use-cases, one relating to simplifying software validation in an avionic system, and the other relating to transparent GPIO-based communication between controllers.

Figure 5:
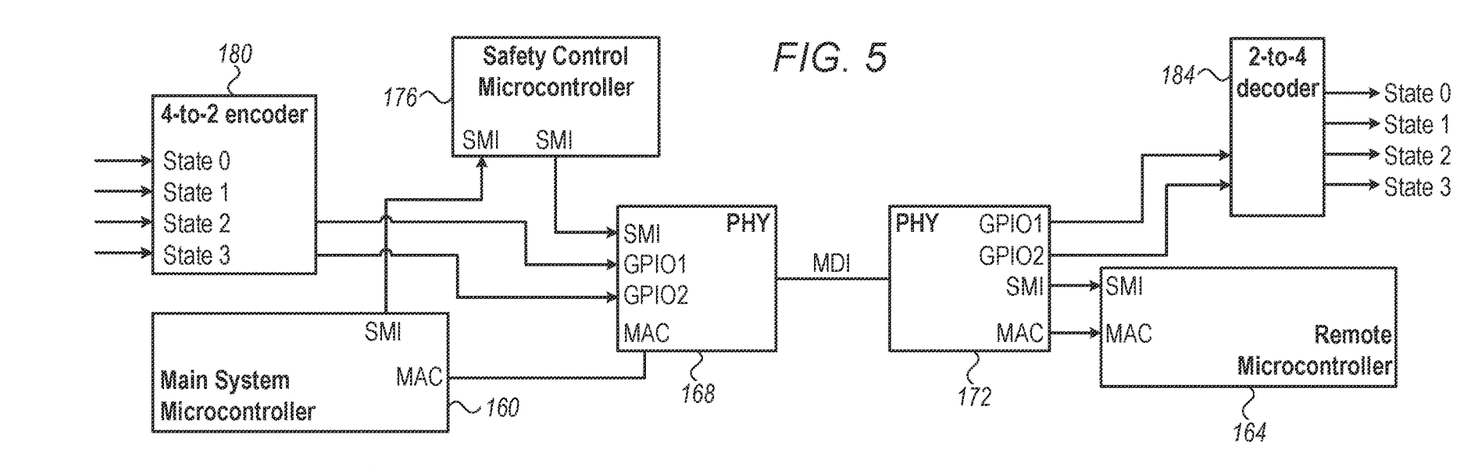
FIG. 5 is a block diagram that schematically illustrates an avionic communication system, in accordance with an embodiment that is described herein.

FIG. 5 is a block diagram that schematically illustrates an avionic communication system, in accordance with an embodiment that is described herein. In the system of FIG. 5, a main system microcontroller (μC) 160 is coupled to an Ethernet PHY device 168, and a remote μC 164 is coupled to an Ethernet PHY device 172. PHY devices 168 and 172 are link partners, and communicate with one another using a MDI over a suitable physical link, e.g., a twisted-pair link. For data transmission, main μC 160 sends the data in layer-2 frames to PHY device 168 over a MAC interface, PHY device 168 sends the data to PHY device 172 in layer-1 frames using the MDI, and PHY device 172 sends the data to remote μC 164 in layer-2 frames over the MAC interface.

In addition to the data transfer between μCs 160 and 164, in the present example it is required to transfer safety messages over the same physical link (MDI). Reusing the same physical link for transferal of safety messages is useful, for example, for reducing the number of wires and simplifying the wiring process.

In one example use case, a safety state having four possible values (denoted State_0 through State_3) is to be transferred to an aircraft entertainment system, e.g., in order to pause the entertainment system during Public Announcements (PA). It is desirable for the safety messages to be transferred independently of main μC 160 and remote μC 164, in order to simplify software validation.

In the embodiment of FIG. 5, the safety messages (safety-state values) are transferred independently of the rest of the system using a safety control μC 176, a 4-to-2 encoder 180 and a 2-to-four decoder 184. Additionally, PHY device 168 has two GPIO input ports denoted GPIO1 and GPIO2, and PHY device 172 has two GPIO output ports denoted GPIO1 and GPIO2. The two PHY devices are configured to transfer the input values of GPIO1 and GPIO2 of PHY device 168 to PHY device 172, and to set the GPIO1 and GPIO2 outputs of PHY device 172 to these values. The PHY devices transfer the two GPIO values by embedding them as GPIO commands in OAM frames, as described above.

In the present example, the value of the safety state is provided (on the left-hand side of the figure) over four inputs corresponding to State_0 through State_3. A single one of these inputs is set to "1" to indicate the current safety state, and the other inputs are set to "0". 4-to-2 encoder 180 converts the four inputs into a two-bit value, and provides the two bits as inputs to ports GPIO1 and GPIO2 of PHY device 168. PHY device 168 transfers the values of GPIO1 and GPIO2 to its link partner (also referred to as "peer PHY device"), PHY device 172, using the disclosed techniques. PHY device 172 sets its GPIO1 and GPIO2 outputs to these values. 2-to-4 decoder 184 decodes the two-bit value carried by GPIO1 and GPIO2, so as to reconstruct and output (on the right-hand side of the figure) the four original values State_0 through State_3.

In this embodiment, the transfer of the safety messages is managed by safety control μC 176, independently of the other microcontrollers in the system. In the present example, the Serial Management Interface (SMI) between main system μC 160 and PHY device 168 passes through safety control μC 176. This configuration is useful, for example, for ensuring that safety aspects of the system cannot be reconfigured at a later time by main μC 160 (e.g., by malware that has compromised the main μC). Passing the SMI via safety control μC 176 is, however, not mandatory.

During normal operation, safety control μC 176 enables SMI traffic to pass through transparently between main system μC 160 and PHY device 168. In order to transfer safety messages, safety control μC 176 overrides the SMI, i.e., prevents SMI traffic of main system μC 160 from passing to PHY device 168, and controls PHY device 168 itself. Safety control μC 176 typically also initializes PHY devices 168 and 172 upon power-up.

Typically, safety control μC 176 is small and runs only a small amount of simple software code. As such, and since safety control μC 176 is separate from μCs 160 and 164, validation of safety-related software is simplified considerably. For example, there is no need to re-validate the safety-related software when updating software in μC 160 or 164.

Figure 6:
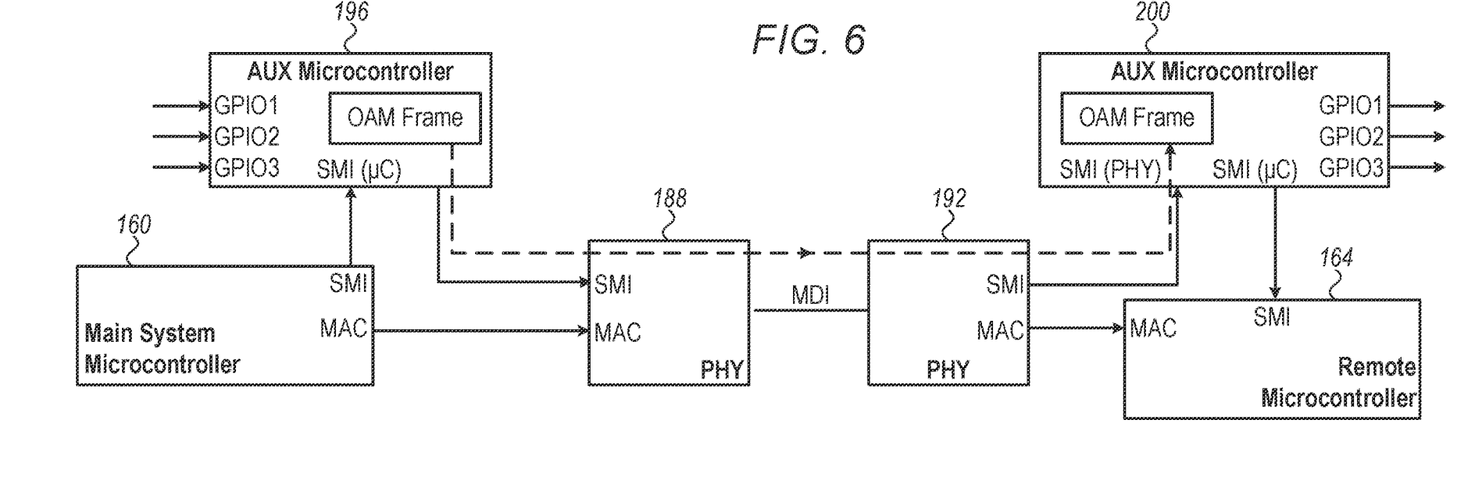
FIG. 6 is a block diagram that schematically illustrates a communication system, in accordance with another embodiment that is described herein.

FIG. 6 is a block diagram that schematically illustrates a communication system, in accordance with another embodiment that is described herein. The embodiment of FIG. 6 demonstrates a configuration in which the GPIO ports are part of the hosts, not of the PHY devices. In the context of the present disclosure and in the claims, a GPIO port is referred to as being associated with a PHY device. The term "associated with" refers to implementations in which the GPIO port is part of the PHY device (as in the example of FIGS. 1, 2 and 5), and to implementations in which the GPIO port is part of a host coupled to the PHY device (as in the example of FIG. 6).

In the system of FIG. 6, main system μC 160 is coupled to an Ethernet PHY device 188, and remote μC 164 is coupled to an Ethernet PHY device 192. PHY devices 188 and 192 are link partners, and communicate with one another using a MDI over a suitable physical link, e.g., a twisted-pair link. For data transmission from main μC 160 to remote μC 164, main μC 160 sends the data in layer-2 frames to PHY device 188 over a MAC interface, PHY device 188 sends the data to PHY device 192 in layer-1 frames using the MDI, and PHY device 192 sends the data to remote μC 164 in layer-2 frames over the MAC interface.

In addition, the system of FIG. 6 comprises a pair of auxiliary μCs 196 and 200 that communicate with one another over the same MDI, using the same pair of PHY devices 188 and 192. In the present example, μC 196 sends to μC 200 three binary values denoted GPIO1, GPIO2 and GPIO3. The communication between auxiliary μCs 196 and 200 is independent of the communication between μCs 160 and 164.

Unlike the previously described embodiments, in the present example the GPIO inputs and outputs are part of the hosts (auxiliary μCs in this example), not part of the PHY devices.

In the present embodiment, the SMI interface between main system μC 160 and PHY device 188 passes through auxiliary μC 196. Similarly, the SMI interface between remote system μC 164 and PHY device 192 passes through auxiliary μC 200. During communication between main system μC 160 and remote system μC 164, auxiliary μC 196 enables SMI traffic to pass through transparently between main system μC 160 and PHY device 188, and auxiliary μC 200 enables SMI traffic to pass through transparently between remote system μC 164 and PHY device 192.

In order for auxiliary μCs 196 and 200 to communicate with one another, each of auxiliary μCs 196 and 200 overrides the respective SMI and controls the respective PHY device itself. Overriding the SMI allows auxiliary μCs 196 and 200 to control the registers in PHY devices 188 and 192 that are used for inserting or reading OAM frames. Additionally, overriding the SMI allows auxiliary μCs 196 and 200 to prevent main μC 160 and remote μC 164 from interrupting the communication channel between the auxiliary μCs (e.g., as a result of malware).

In the embodiment of FIG. 6, auxiliary μC 196 transmits the values of GPIO1, GPIO2 and GPIO3 to auxiliary μC 200 by composing an OAM frame that carries these values as GPIO commands, and writing the OAM frame to PHY device 188. PHY device 188 transmits the OAM frame to PHY device 192 as part of the stream of layer-1 frames, using the disclosed techniques. PHY device 192 extracts the OAM frame from the stream and writes the OAM frame to auxiliary μC 200, which in turn sets its GPIO1, GPIO2 and GPIO3 outputs accordingly.

The configurations of the communication systems shown in FIGS. 1, 5 and 6, and of their components, such as the Ethernet PHY device shown in FIG. 2 and the various ECUs and microcontrollers, are example configurations that are depicted solely for the sake of clarity. In alternative embodiments, any other suitable configurations can be used.

For example, as noted above the logic values (transferred between PHY devices to control GPIO ports) may be discrete or analog, static or time-varying. The logic values may form temporal patterns that carry multiple bits of information. By varying one or more logic values over time, the disclosed techniques can be used for implementing serial or parallel data links between PHY devices. As another example, a GPIO port can be used for bidirectional signaling or communication, e.g., using an open-drain configuration. Any combination of such features can be used, and any feature can be reconfigured at any desired time. In an example embodiment, the disclosed technique is used for implementing a protocol interface between PHY devices. Such an interface can be used, for example, for configuring a PHY device remotely. Elements that are not mandatory for understanding of the disclosed techniques have been omitted from the figures for the sake of clarity.

The different elements of the disclosed communication systems, and their components, may be implemented using dedicated hardware or firmware, such as using hard-wired or programmable logic, e.g., in one or more Application-Specific Integrated Circuits (ASICs) or Field-Programmable Gate Arrays (FPGAs). Additionally or alternatively, some functions, e.g., functions of any of microcontrollers 68 and 76 (FIG. 1), PHY controller 112 (FIG. 2), microcontrollers 160, 164 and 176 (FIG. 5) and/or microcontrollers 196 and 200 (FIG. 6), may be implemented in software and/or using a combination of hardware and software elements.

In some embodiments, any of microcontrollers 68 and 76 (FIG. 1), PHY controller 112 (FIG. 2), microcontrollers 160, 164 and 176 (FIG. 5) and/or microcontrollers 196 and 200 (FIG. 6) may comprise a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, although the embodiments described herein mainly address automotive and avionic applications, the methods and systems described herein can also be used in other applications that involve control of GPIO ports, such as in industrial or smart-home communication systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An in-vehicle Ethernet communication system, comprising:
   a first Ethernet Physical layer (PHY) device comprising (i) a first interface configured to connect to a first controller and (ii) multiple first General-Purpose Input-Output (GPIO) ports; and
   a second Ethernet PHY device comprising (i) a second interface configured to connect to a second controller and (ii) multiple second GPIO ports,
   the first and second Ethernet PHY devices being configured to:
      transfer data between the first and second controllers by (i) communicating with the first and second controllers via the first and second interfaces and (ii) transmitting and receiving, over a physical Ethernet link between the first and second Ethernet PHY devices, layer-1 Ethernet frames that carry the data; and
      transfer a multi-bit value comprising multiple bits, from a state encoder to a state decoder, using the same first and second Ethernet PHY devices and over the same physical Ethernet link used for transferring the data between the first and second controllers and independently of the first and second controllers, by:
         receiving the multiple bits of the multi-bit value from the state encoder on the respective multiple first GPIO ports of the first Ethernet PHY device;
         sending the multiple bits of the multi-bit value from the first Ethernet PHY device to the second Ethernet PHY device, over the physical Ethernet link, in an Ethernet Operations Administration and Maintenance (OAM) frame that is interleaved among the layer-1 Ethernet frames; and outputting the multiple bits of the multi-bit value to the state decoder on the respective multiple second GPIO ports of the second Ethernet PHY device.

2. The in-vehicle Ethernet communication system according to claim 1, wherein, in transferring the multi-bit value, the first and second Ethernet PHY devices are configured to indicate a safety state selected from among a plurality of safety states.

3. The in-vehicle Ethernet communication system according to claim 1, wherein:

the state encoder is configured to encode an input so as to produce the multiple bits, and to provide the multiple bits to the multiple first GPIO ports of the first Ethernet PHY device; and the state decoder is configured to receive the multiple bits from the multiple second GPIO ports of the second Ethernet PHY device, and to reconstruct the input from the received multiple bits.

4. The in-vehicle Ethernet communication system according to claim 1, further comprising a safety controller, configured to enable transfer of a safety message represented by the multi-bit value, by overriding a management interface used by the first system controller to control the first Ethernet PHY device.

5. The in-vehicle Ethernet communication system according to claim 4, wherein the safety controller is (i) separate from the first and second controllers and (ii) configured to initialize the first and second Ethernet PHY devices.

6. A method for communication in an in-vehicle Ethernet communication system that includes (i) a first Ethernet Physical layer (PHY) device comprising a first interface configured to connect to a first controller, and multiple first General-Purpose Input-Output (GPIO) ports, and (ii) a second Ethernet PHY device comprising a second interface configured to connect to a second controller, and multiple second GPIO ports, the method comprising:

transferring data between the first and second controllers by (i) communicating with the first and second controllers via the first and second interfaces and (ii) transmitting and receiving, over a physical Ethernet link between the first and second Ethernet PHY devices, layer-1 Ethernet frames that carry the data; and transferring a multi-bit value comprising multiple bits, from a state encoder to a state decoder, using the same first and second Ethernet PHY devices and over the same physical Ethernet link used for transferring the data between the first and second controllers and independently of the first and second controllers, by:

receiving the multiple bits of the multi-bit value from the state encoder on the respective multiple first GPIO ports of the first Ethernet PHY device;

sending the multiple bits of the multi-bit value from the first Ethernet device to the second Ethernet PHY device, over the physical Ethernet link, in an Ethernet Operations Administration and Maintenance (OAM) frame that is interleaved among the layer-1 Ethernet frames; and outputting the multiple bits of the multi-bit value to the state decoder on the respective multiple second GPIO ports of the second Ethernet PHY device.

7. The method for communication according to claim 6, wherein transferring the multi-bit value comprises indicating a safety state selected from among a plurality of safety states.

8. The method for communication according to claim 6, further comprising:

using the state encoder, encoding an input so as to produce the multiple bits, and providing the multiple bits to the multiple first GPIO ports of the first Ethernet PHY device; and using the state decoder, receiving the multiple bits from the multiple second GPIO ports of the second Ethernet PHY device, and reconstructing the input from the received multiple bits.

9. The method for communication according to claim 6, further comprising enabling transfer of a safety message represented by the multi-bit value, by overriding a management interface used by the first controller to control the first Ethernet PHY device.

10. The method for communication according to claim 9, wherein enabling the transfer of the safety message is performed by a safety controller that is separate from the first and second controllers, and further comprising initializing the first and second Ethernet PHY devices by the safety controller.

* * * * *